United States Patent [19]

Oyama

[11] Patent Number: 4,622,934

[45] Date of Patent: Nov. 18, 1986

[54] CRANKSHAFT STRUCTURE OF TWO-CYCLE INTERNAL COMBUSTION ENGINE

[75] Inventor: Kazuo Oyama, Niiza, Japan

[73] Assignee: Honda Giken Koygo Kabushiki Kaisha, Tokyo, Japan

[21] Appl. No.: 654,287

[22] Filed: Sep. 25, 1984

Related U.S. Application Data

[62] Division of Ser. No. 424,175, Sep. 27, 1982, abandoned.

[30] Foreign Application Priority Data

Sep. 26, 1981 [JP] Japan ............................ 56-141978
Sep. 28, 1981 [JP] Japan ............................ 56-142693

[51] Int. Cl.$^4$ ............................................. F02B 75/32
[52] U.S. Cl. ............................. 123/197 AC; 74/597; 384/429
[58] Field of Search ....... 123/197 R, 197 AC, 74 AE, 123/196 CP, 195 R; 74/595, 596, 597; 29/6, 156.4 R; 384/429

[56] References Cited

U.S. PATENT DOCUMENTS

| | | | |
|---|---|---|---|
| 1,613,835 | 1/1927 | Kasper | 74/597 |
| 1,775,926 | 9/1930 | Barbarou | 123/195 R |
| 2,745,504 | 5/1956 | Gilardi | 74/595 |
| 2,751,146 | 6/1956 | Moseley | 384/429 |
| 3,563,222 | 2/1971 | Ishida | 123/197 R |
| 4,109,622 | 8/1978 | Fujikawa et al. | 74/597 |
| 4,265,495 | 5/1981 | Backlin | 384/429 |
| 4,483,279 | 11/1984 | Kohler et al. | 123/195 R |

FOREIGN PATENT DOCUMENTS

| | | | |
|---|---|---|---|
| 206971 | 11/1923 | United Kingdom | 123/197 R |
| 801245 | 9/1958 | United Kingdom | 123/197 R |
| 922915 | 4/1963 | United Kingdom | 123/197 R |

Primary Examiner—Craig R. Feinberg
Assistant Examiner—David A. Okonsky
Attorney, Agent, or Firm—Armstrong, Nikaido, Marmelstein & Kubovcik

[57] ABSTRACT

In a crankshaft structure of two-cycle internal combustion engine, a crank web is provided with a reduced diameter portion at one end thereof coming in the proximity of a bearing which rotatably carries a crank journal and a sealing member is disposed on the outer periphery of the reduced diameter portion. This arrangement advantageously reduces the axial length of the crankshaft while keeping a desired length of the supporting part of the crank web fitted with the crank journal.

2 Claims, 2 Drawing Figures

CRANKSHAFT STRUCTURE OF TWO-CYCLE INTERNAL COMBUSTION ENGINE

This is a division of Ser. No. 424,175 filed Sept. 27, 1982 and now abandoned.

BACKGROUND OF THE INVENTION

1. FIELD OF THE INVENTION

The present invention relates to a crankshaft structure of two-cycle internal combustion engine for a vehicle such as motorcycle or the like.

2. DESCRIPTION OF THE PRIOR ART

In a conventional two-cycle internal combustion engine, for example, of the type having two cylinders disposed in parallel with each other, the crankshaft structure is arranged such that in the axial direction of the crankshaft are disposed a crank web for one cylinder, a first bearing, a sealing member such as labyrinth seal, a second bearing and a crank web for another cylinder in the mentioned order, in other words, two bearings are disposed on both sides of the midst sealing member on a crank journal portion. This arrangement increases the axial length of the crank journal portion and therefore leads to a large total width of the engine, causing the mounting position of the engine on a body of vehicle, such as a motorcycle, to be shifted upwardly for ensuring a desired banking angle.

With this conventional arrangement, more dead space is produced around the crank journal portion to increase the volume of crank chamber, thereby deteriorating the primary compression ratio. For solving this problem, a measure may be taken that the total width of engine is reduced by shortening the axial width of each of the crank webs, however, this undesirably results in shortage of the length of a supporting part of the crank web as fitted with the crank journal portion.

SUMMARY OF THE INVENTION

The present invention has been proposed to solve the above problems inherent to conventional structures and has as its object the provision of a crankshaft structure of two-cycle internal combustion engine for a vehicle in which the total width of the engine is reduced and the primary compression ratio is improved while maintaining the supporting part of each crank web of a crankshaft with a desired axial length.

In order to achieve the above object, according to the invention, there is provided a crankshaft structure of two-cycle internal combustion engine wherein a crank web has opposite ends of which one end is disposed adjacent a bearing and is formed as a reduced diameter portion having a smaller diameter than the other end, the reduced diameter portion having a sealing member disposed on the outer periphery thereof.

Due to the above-specified arrangement, the length of the crankshaft can be shortened to reduce the total width of the engine whereby a larger banking angle is obtained in case the engine is mounted on a vehicle body on the same level as a conventional engine.

Furthermore, irrespective of the shortened length of the crankshaft, owing to the structure that a sealing member is mounted on the outer periphery of the reduced diameter portion of the crank web, the supporting part of the crank web as fitted with the crank journal portion can be made to have a sufficient axial length, which ensures a reliable assembly of the crankshaft. As a result, the engine performance is not deteriorated.

Still further, since the crank chamber can be made compact in volume, the primary compression ratio is enhanced to improve the engine performance.

BRIEF DESCRIPTION OF THE DRAWINGS

The accompanying drawings will be briefly described hereunder.

DETAILED DESCRIPTION OF THE PREFERRED EMBODIMENT

Now the present invention will be described in a greater detail hereunder with reference to the accompanying drawings which illustrate a preferred embodiment of the invention.

In the accompanying drawings a three cylinder type two-cycle internal combustion engine for a motorcycle or the like is shown. The internal combustion engine includes three cylinders $C_1$, $C_2$ and $C_3$ and the first and second cylinders $C_1$ and $C_2$ are arranged in series in the axial direction of a crankshaft, while the third cylinder $C_3$ is arranged between the first and second cylinders $C_1$ and $C_2$ in a V-shaped configuration.

Pistons $1_a$, $1_b$ and $1_c$ slidably fitted into the respective cylinders $C_1$, $C_2$ and $C_3$ are connected to a common crankshaft 3 by way of their connecting rods $2_a$, $2_b$ and $2_c$.

Figure 2:
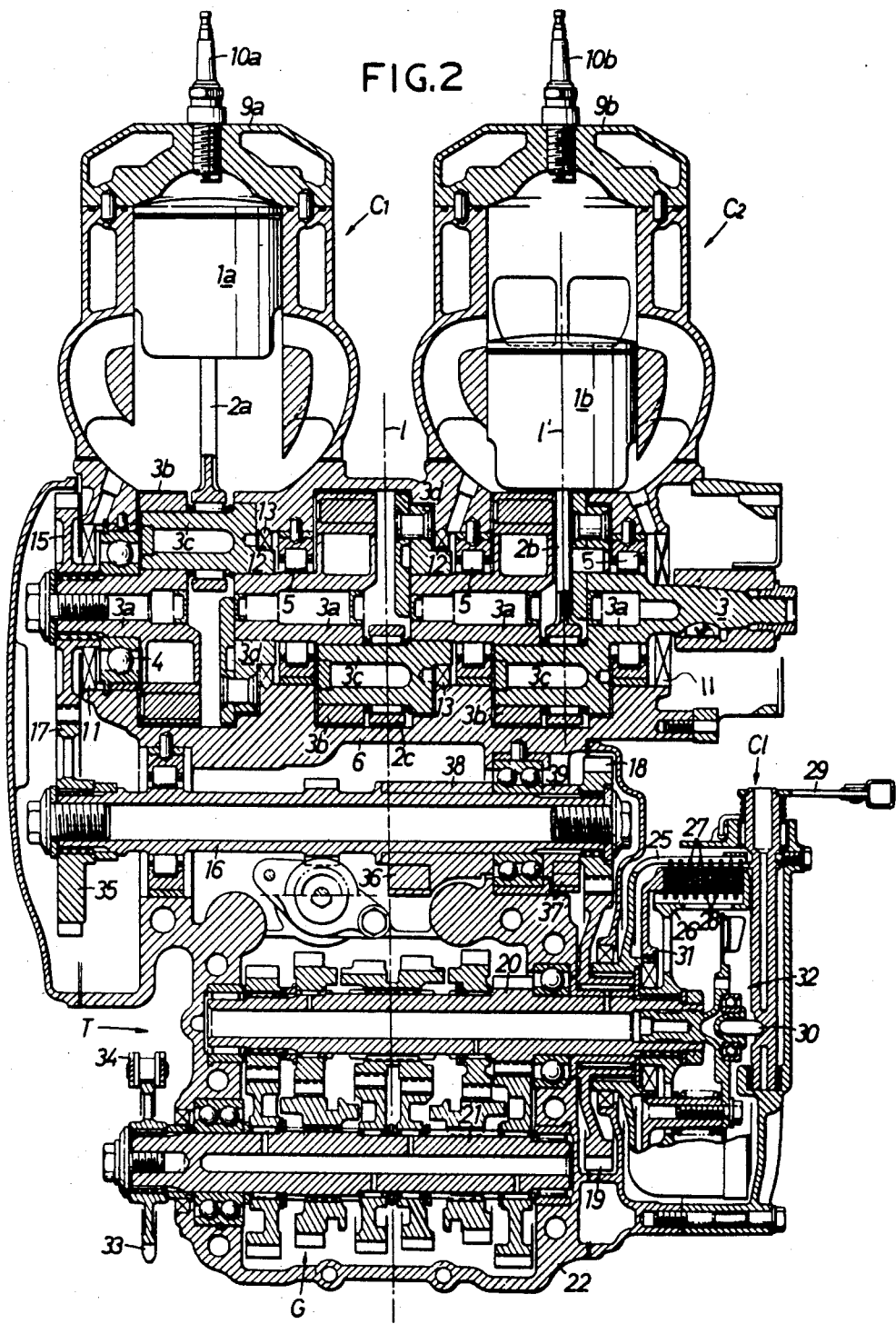
FIG. 2 is a sectional view of the internal combustion engine taken in line II—II in FIG. 1.

As shown in FIG. 2, the crankshaft 3 includes journals $3_a$ rotatably supported in a crank case 6 by means of bearings 4 and 5, webs $3_b$ firmly fitted onto said journals $3_a$ and crank pins $3_c$ press fitted into said webs $3_b$ and one end of each of the connecting rods $2_a$, $2_b$ and $2_c$ is fitted rotatably about the crank pin $3_c$.

On the cylinders $C_1$, $C_2$ and $C_3$ are mounted cylinder heads $9_a$, $9_b$ and $9_c$ which are equipped with ignition plugs $10_a$, $10_b$ and $10_c$ of which electrodes are exposed to the combustion chambers of the respective cylinders. The electrodes of the ignition plugs $10_a$, $10_b$ and $10_c$ are located with an angular distance of 120 degrees between one another and their ignition is effected sequentially in the mentioned order. As is apparent from FIG. 1, the pistons $1_a$, $1_b$ and $1_c$ in the cylinders $C_1$, $C_2$ and $C_3$ are operatively connected to the crank pins $3_c$ on the crankshaft 3 by way of the connecting rods $2_a$, $2_b$ and $2_c$ which are disposed with a difference in phase of 120 degrees between one another.

As shown in FIG. 2, the crankshaft 3 is fitted with sealing member 11 at both end parts, and the intermediate crank webs $3_d$ with the crank pins $3_c$ integrally fitted thereto are each formed with a reduced diameter portion 12 at one end thereof coming in the proximity of the roller bearing 5, which has a smaller diameter than the other end and with which a sealing member 13 is brought in sliding contact. An oil seal is employed here as the sealing member 13. This enables the length of the crankshaft 3 to be reduced in the axial direction by the width of the sealing members 13 without any reduction in length of the supporting part of the crank webs $3_d$ firmly fitted onto the crank journals $3_a$, as is different from the conventional arrangement where sealing members are disposed on the crank journals $3_a$ adjacent such crank webs.

Further, the crankshaft 3 includes at its one end a driving gear 15 which meshes with a driven gear 17 disposed at one end of a primary shaft 16 extending in parallel to the crankshaft 3. It should be noted that both the driving and driven gears 15 and 17 are dimensioned to have an equal diameter and thereby the primary shaft 16 is caused to rotate at the same speed as that of the crankshaft 3. At the other end of the primary shaft 16 is disposed a driving gear 18 for the first speed reduction. The driving gear 18 meshes with a driven gear 19 which is rotatably mounted on a main shaft 20 of a transmission mechanism T to be described later.

The transmission mechanism T includes the main shaft 20 and a countershaft 21 both of which are rotatably supported in a transmission casing 22 integral with the crank case 6, said main shaft 20 and said countershaft 21 extending in parallel to one another and including a group of speed change gears G which are adapted to shift in the axial direction by actuating a shifting lever (not shown) in the conventional manner so as to determine a certain reduction ratio between the main shaft 20 and the countershaft 21.

At one end of the main shaft 20 in the transmission mechanism T is disposed a clutch C1 which serves to control power transmission from the first speed reduction driving gear 18 to the main shaft 20 in an ON-OFF manner. The clutch C1 essentially comprises a clutch outer member 25 spline fitted onto the driven gear 19 so as to rotate together with the latter, a clutch inner member 26 spline fitted onto one end of the main shaft 20 in the clutch outer member 25, a number of driving frictional discs 27 spline fitted into the clutch outer member 25, a number of driven frictional discs 28 spline fitted onto the clutch inner member 26, said driven frictional discs 28 being located between the adjacent driving frictional discs 27, and a clutch actuating mechanism 32 including an actuating rod 29 for effecting engagement and disengagement between both the driving and driven frictional discs 27 and 28, a cam 30 and a thrusting member 31. Since the above-described members and actuating mechanism are designed and constructed in a well known manner, detailed description thereof will not be required.

The countershaft 21 in the transmission mechanism T has an extension at its other end part located opposite to the clutch C1, said extension being projected from the transmission case 22 so as to carry a driving sprocket wheel 33 spline fitted onto the outermost end of the extension of the countershaft 21. The driving sprocket wheel 33 is operatively connected to a driven sprocket wheel (not shown) by way of an endless chain 34 so as to drive a driven member such as a rear wheel of a motorcycle (not shown).

Figure 1:
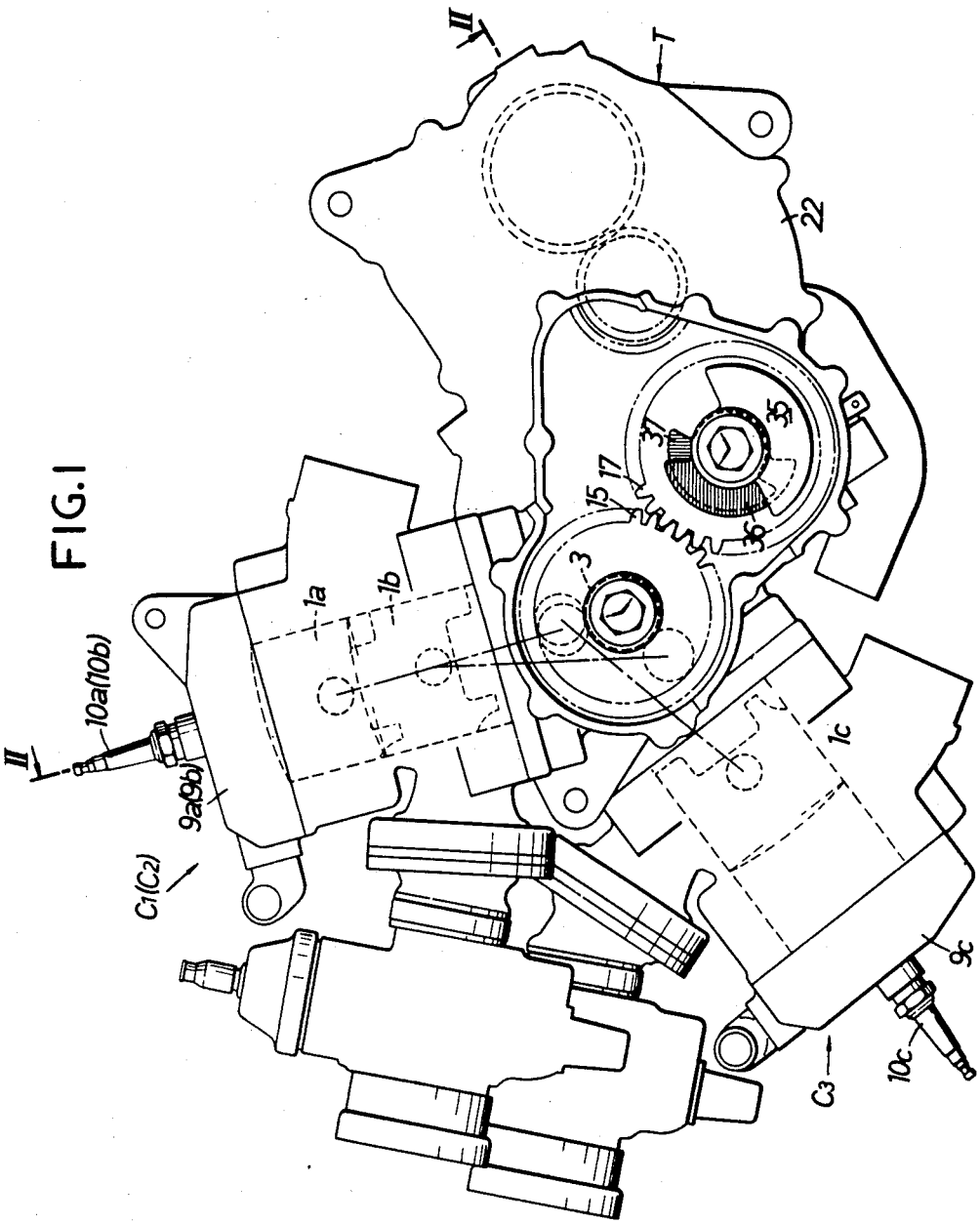
FIG. 1 is a partially sectioned side view of a multicylinder type internal combustion engine including a transmission mechanism according to the invention.

To eliminate primary unbalanced inertia force and unbalanced inertia moment caused during the reciprocable movement of the pistons $1_a$, $1_b$ and $1_c$ to be adversely exerted on the crankshaft 3 a balancer is provided on the primary shaft 16. Specifically, the balancer comprises three eccentric weights 35, 36 and 37. The first eccentric weight 35 is integral with the driven gear 17, the second eccentric weight 36 is fixedly mounted on a sleeve 38 press fitted onto the primary shaft 16, said second eccentric weight 36 being located appreciably rightward of the center line l of the center third cylinder $C_3$ as seen in the drawing, and the third eccentric weight 37 is fixedly mounted on a sleeve 39 press fitted onto the primary shaft 16, said third eccentric weight 37 being located on the center line l' of the right-hand second cylinder $C_2$. The first to third balance weights 35 to 37 are disposed about the primary shaft 16 in an angularly spaced relation as shown in FIG. 1 so that the primary unbalanced inertia force and unbalanced inertia moment are eliminated by the whole assembly of the balance weights 35 to 37.

Operation of the internal combustion engine of the invention will be described below.

As the engine starts its operation, the pistons $1_a$, $1_b$ and $1_c$ in the respective cylinders $C_1$, $C_2$ and $C_3$ are caused to reciprocate successively at an angular phase displacement of 120 degrees and thereby the crankshaft 3 is rotated. The primary shaft 16 is in turn rotated via the driving shaft 15 and the driven shaft 17. When the clutch C1 is actuated so as to come in operative engagement, generated power is transmitted from the primary shaft 16 to the main shaft 20 in the transmission mechanism T via the first speed reduction driving and driven gears 18 and 19, the clutch outer member 25, the driving and driven frictional discs 27 and 28 and the clutch inner member 26. Then, it is transmitted to the countershaft 21 via the group of speed reduction gears G with the rotational speed reduced to a selected level. Further, it is transmitted from the countershaft 21 to the driven member such as rear wheel of a motorcycle or the like, which is in operative connection with the driven sprocket wheel, via the driving sprocket wheel 33, the endless chain 34 and the driven sprocket wheel (not shown).

The present invention has been described above merely with respect to the illustrated embodiment but it should be of cource understood that the invention should not be limited only to this and changes or modifications may be made without any departure from the spirit and scope of the invention.

What is claimed is:

1. A crankshaft structure in a two-cycle internal combustion engine comprising a crank web and a crank journal rotatably supported in a crank case by a bearing means, said crank web including a supporting part having a central bore for receiving said crank journal press-fit therein, said supporting part having a reduced outer diameter portion disposed adjacent said bearing means supporting the crank journal and at an axial position overlying a press-fit part of said crank journal in said central bore of said crank web supporting part, said reduced outer diameter portion of said supporting part having a sealing member disposed on the outer periphery thereof.

2. A crankshaft structure as claimed in claim 1, wherein said engine has a plurality of cylinders and said sealing member is employed for each of a plurality of the crank webs.

* * * * *